(12) United States Patent
Zahalka et al.

(10) Patent No.: US 8,916,065 B2
(45) Date of Patent: Dec. 23, 2014

(54) PHOSPHITE COMPOSITIONS

(71) Applicant: Addivant Switzerland GmbH, Reinach BL (CH)

(72) Inventors: Hayder Zahalka, Morgantown, WV (US); Maurice Power, Manchester (GB); Jonathan S. Hill, Manchester (GB); Peter Smith, Avon, CT (US)

(73) Assignee: Addivant Switzerland GmbH (CH)

( * ) Notice: Subject to any disclaimer, the term of this patent is extended or adjusted under 35 U.S.C. 154(b) by 0 days.

(21) Appl. No.: 14/053,489

(22) Filed: Oct. 14, 2013

(65) Prior Publication Data

US 2014/0045981 A1 Feb. 13, 2014

Related U.S. Application Data

(63) Continuation of application No. PCT/EP2013/066329, filed on Aug. 2, 2013.

(60) Provisional application No. 61/814,930, filed on Apr. 23, 2013, provisional application No. 61/678,794, filed on Aug. 2, 2012.

(51) Int. Cl.
| | | |
|---|---|---|
| C09K 15/32 | (2006.01) | |
| C08K 5/00 | (2006.01) | |
| C08K 5/51 | (2006.01) | |
| C01F 7/00 | (2006.01) | |
| C08K 5/526 | (2006.01) | |
| C08K 5/17 | (2006.01) | |

(52) U.S. Cl.
CPC . *C08K 5/526* (2013.01); *C08K 5/17* (2013.01); *C08K 5/0008* (2013.01)
USPC .................. 252/400.24; 524/151; 524/153

(58) Field of Classification Search
None
See application file for complete search history.

(56) References Cited

U.S. PATENT DOCUMENTS

| | | |
|---|---|---|
| 7,468,410 B2 | 12/2008 | Chatin et al. |
| 7,888,414 B2 | 2/2011 | Gelbin et al. |
| 8,008,383 B2 | 8/2011 | Gelbin et al. |
| 8,008,384 B2 | 8/2011 | Gelbin et al. |
| 8,008,385 B2 | 8/2011 | Hill et al. |
| 8,048,946 B2 | 11/2011 | Hill et al. |
| 8,178,005 B2 | 5/2012 | Gelbin et al. |
| 8,188,170 B2 | 5/2012 | Zahalka et al. |
| 8,309,635 B2 | 11/2012 | Gelbin et al. |
| 2010/0025636 A1* | 2/2010 | Gelbin et al. ............ 252/400.24 |
| 2011/0028618 A1* | 2/2011 | Gelbin et al. ................ 524/153 |

FOREIGN PATENT DOCUMENTS

| | | |
|---|---|---|
| WO | WO2007/149143 | 12/2007 |
| WO | WO2011/014209 | 2/2011 |
| WO | WO2011/014529 | 2/2011 |

OTHER PUBLICATIONS

Kirpichinov et. al, Vysokomolekulyarnye Soedineniya, Seriya B: Kratkie Soobshcheniya (Macromolecular Compounds, Series B: Short Messages), (1970) 12(3), 189-92.
International Search Report and Written Opinion for PCT/EP2013/066329, date of mailing Oct. 21, 2013.

* cited by examiner

*Primary Examiner* — Harold Pyon
*Assistant Examiner* — Tanisha Diggs
(74) *Attorney, Agent, or Firm* — Knobbe Martens Olson & Bear, LLP

(57) ABSTRACT

Solid phosphite compositions comprising tris(4-t-alkylphenyl)phosphites and selected hydroxyalkyl amines exhibit surprising performance compared with other phosphite stabilizers in the stabilization of polymers, such as polyolefins and the like, particularly in the prevention of color formation during high temperature processing or when exposed to certain gasses during storage, e.g., "gas fading".

19 Claims, No Drawings

PHOSPHITE COMPOSITIONS

RELATED CASES

This application is a continuation of International Application No. PCT/EP2013/066329, filed on Aug. 2, 2013, which claims the benefit of U.S. Provisional Application Nos. 61/678,794, filed Aug. 2, 2012 and 61/814,930, filed Apr. 23, 2013, the entire disclosures of which are incorporated by reference herein.

BACKGROUND OF THE INVENTION

The present invention provides solid phosphite compositions with relatively high phosphorus loadings for use as stabilizing additives in polymeric compositions and articles. In particular, compositions in accordance with the invention may comprise tris(4-t-alkylphenyl) phosphites and selected amines, which compositions provide excellent stabilization of polymers, such as polyolefins and the like, particularly in the prevention of color formation during high temperature processing or when exposed to certain gasses during storage, e.g., "gas fading", and yet which are themselves relatively resistant to hydrolysis.

Organic phosphites are well known and long used in the art as antioxidants for polymeric resins, often in the presence of other antioxidants. One common problem for most phosphites is the tendency to undergo unfavorable hydrolysis upon exposure to moisture or water during storage or handling, which diminishes the activity of the stabilizer, makes it hard to handle and can even cause damage to processing equipment, e.g., corrosion of metal parts, as discussed for example in U.S. Pat. No. 8,048,946, incorporated herein by reference. For example, Kirpichinov et.al, Vysokomolekulyarnye Soedineniya, Seriya B: Kratkie Soobshcheniya (Macromolecular Compounds, Series B: Short Messages), (1970) 12(3), 189-92 states that regarding phosphite stabilizers, "the colour stabilizing properties depend directly on their hydrolytic stability".

Tris(alkylaryl)phosphite stabilizers having hindered alkyl groups at the ortho positions relative to the C—O—P bond are resistant to hydrolysis due to steric hindrance. One of the most widely used phosphites is tris(2,4-di-t-butylphenyl) phosphite, a white crystalline solid having a relatively high melting point between 180-185° C., and having a bulky alkyl group at both the ortho and para positions. Tris(2,4-di-t-butylphenyl)phosphite has been demonstrated effectively to reduce peroxide induced oxidative degradation for many polymers including polyolefins, polycarbonates, ABS and polyesters etc. The trisalkylaryl phosphite has low volatility that allows for its use at high temperatures commonly required for processing thermoplastic polymers. However, there are processing and compatibility issues with tris(2,4-di-t-butylphenyl)phosphite which compromise its performance in certain polymers and under certain conditions. For example it is known to plate out during processing of some plastics, in particular low melting point plastics, forming deposits on processing machinery surfaces.

Other tris(alkylaryl)phosphites and phosphite compositions, such as the liquid tris(p-nonylphenyl)phosphite, are known which can be used with e.g., polyolefins, without exhibiting the same plate out issues that can be encountered with high melting solid phosphites such as tris(2,4-di-t-butylphenyl)phosphite. Tris(p-nonylphenyl)phosphite (TNPP) however, lacks steric hindrance at the ortho position and is susceptible to hydrolysis.

U.S. Pat. Nos. 7,888,414; 8,008,383; 8,008,384; 8,178,005 and 8,188,170, the disclosures of which are incorporated by reference, disclose liquid phosphites compositions comprising a mixture of alkylphenyl phosphites, typically a mixture of solid phosphites that when appropriately combined exist as a liquid under ambient conditions. These phosphite mixtures are more readily incorporated into many polymer resins than tris(2,4-di-t-butylphenyl)phosphite and are less prone to plate out in, e.g., polyolefins.

Liquid additives however often require processing and storage equipment different from that used with solid additives and can therefore present handling difficulties in some polymer processing facilities. U.S. Pat. Nos. 8,008,385 and 8,309,635, the disclosures of which are incorporated by reference, disclose solid blends of phosphites similar to the previous liquid phosphite blends, but having a different ratio of the individual components. Many of these blends comprise tris(2,4-di-t-butylphenyl)phosphite and/or tris(2,4-di-t-amylphenyl)phosphite in significant quantities.

It is widely believed that while the hindrance of the ortho-substituent in tris(2,4-di-t-butylphenyl)phosphite makes the compound more resistant to hydrolysis, it also sterically encumbers the active phosphorus site making the compound a less kinetically active peroxide decomposer, and thus less effective overall as an anti-oxidant. Further, the presence of a second alkyl group on the phenyl substituent increases the molecular weight of the phosphite considerably by adding essentially inert carbon atoms and thus decreases the weight percent of active phosphorus. For example, tris(2,4-di-t-butylphenyl)phosphite contains 4.8% phosphorus while tris(4-mono-t-butylphenyl)phosphite contains 6.4% phosphorus.

It is known that the addition of certain amines, e.g., triisopropanol amine, can improve the resistance of liquid phosphites and certain combinations of solid phosphites to hydrolysis, see for example, the discussion in U.S. Pat. Nos. 8,048,946, 8,008,385 and 8,309,635. However, there remains a commercial need to provide improved antioxidant compositions, in particular compositions which have relatively high phosphorus loadings to provide enhanced antioxidant activity per gram of composition, and which have hydrolytic stability effective to permit reasonable storage of the composition prior to being blended with or otherwise incorporated into polymeric materials, and also maintain sufficient hydrolytic stability once blended with or otherwise incorporated into polymeric materials in order to provide continuing antioxidant activity during the commercial life of the polymeric material in question.

SUMMARY OF THE INVENTION

According to the present invention there is provided a polymer stabilizing composition comprising a first component comprising one or more solid tris(monoalkylaryl) phosphites and a second component comprising an alkanolamine, wherein the one or more solid tris(monoalkylaryl)phosphites is or are present in the composition in an amount exceeding 95 wt % with respect to the total amount of alkylaryl phosphite present in the composition.

When the first component comprises a single solid tris (monoalkylaryl) phosphite then that single material is present in the polymer stabilizing composition in an amount exceeding 95 wt % with respect to the total amount of alkylaryl phosphite present in the polymer stabilizing composition. When the first component comprises more than one solid tris(monoalkylaryl)phosphite then the total amount of all solid tris(monoalkylaryl)phosphites present in the polymer stabilizing composition exceeds 95 wt % of the total amount of alkylaryl phosphite present in the polymer stabilizing composition.

The invention also provides a stabilized polymeric composition comprising a polymer blended with or otherwise incorporating a first component comprising one or more solid tris(monoalkylaryl)phosphites and a second component comprising an alkanolamine, wherein the one or more solid tris(monoalkylaryl)phosphites is or are present in the composition in an amount exceeding 95 wt % with respect to the total amount of alkylaryl phosphite present in the composition.

When the first component comprises a single solid tris(monoalkylaryl) phosphite then that single material may be present in the stabilized polymeric composition in an amount exceeding 95 wt % with respect to the total amount of alkylaryl phosphite present in the stabilized polymeric composition. When the first component comprises more than one solid tris(monoalkylaryl)phosphite then the total amount of all solid tris(monoalkylaryl)phosphites present in the stabilized polymeric composition may exceed 95 wt % of the total amount of alkylaryl phosphite present in the stabilized polymeric composition.

The first and second components of the polymer stabilizing composition may be pre-mixed or pre-blended prior to being blended with or otherwise incorporated into the polymer; or they may separately be blended with or otherwise incorporated into the polymer.

When the first and second components of the polymer stabilizing composition are separately blended with or otherwise incorporated into the polymer they may be blended with or otherwise incorporated into the polymer sequentially or simultaneously.

When the first and second components of the polymer stabilizing composition are separately and sequentially blended with or otherwise incorporated into the polymer, the first component of the polymer stabilizing composition may be blended with or otherwise incorporated into the polymer before or after the second component of the polymer stabilizing composition.

The first and second components may comprise further materials, and exemplary types of such material, functional additives for example, are discussed later on in this specification. Such further materials may also or instead be provided in the form of one or more further components of the composition provided that whatever other further materials and/or components are provided (if any) the one or more solid tris(monoalkylaryl)phosphites is or are present in the composition in an amount exceeding 95 wt % with respect to the total amount of alkylaryl phosphite present in the composition.

The one or more solid tris(monoalkylaryl)phosphites may be present in the polymer stabilizing composition of the invention, or in the stabilized polymeric composition of the invention, as the case may be, in an amount exceeding 96 wt %, 97 wt %, 98 wt % or 99 wt % with respect to the total amount of alkylaryl phosphite present in the composition. Solid tris(monoalkylaryl)phosphite(s) may constitute 100 wt % of all alkylaryl phosphite present in the composition.

Optionally solid tris(monoalkylaryl)phosphite may be present in the polymer stabilizing composition of the invention, or in the stabilized polymeric composition of the invention, as the case may be, in an amount exceeding 95 wt %, 96 wt %, 97 wt %, 98 wt % or 99 wt % with respect to the total amount of phosphite antioxidant present in the composition. Solid tris(monoalkylaryl)phosphite(s) may constitute 100 wt % of all phosphite antioxidant present in the composition.

The or each solid tris(monoalkylaryl)phosphite may be solid at ambient temperature, namely 25° C. The aryl group may be phenyl and the alkyl group may be a $C_1$ to $C_8$ alkyl group, in particular it may be butyl or pentyl. The alkyl group may be a straight or branched chain group. The aryl group is preferably monoalkylated at the ortho or para position with respect to the phosphite linkage.

The or each solid tris(monoalkylaryl)phosphite may be selected from, for example, tris(mono($C_{1-5}$ alkyl)aryl)phosphites or, more specifically, from tris(mono(($C_{1-5}$ alkyl)phenyl)phosphites. In either case the $C_{1-5}$ alkyl group may be straight or branched chain, and butyl and pentyl (or amyl) groups, including t-butyl and t-pentyl, will often be selected.

Thus, the or each solid tris(monoalkylaryl)phosphite may have the formula:

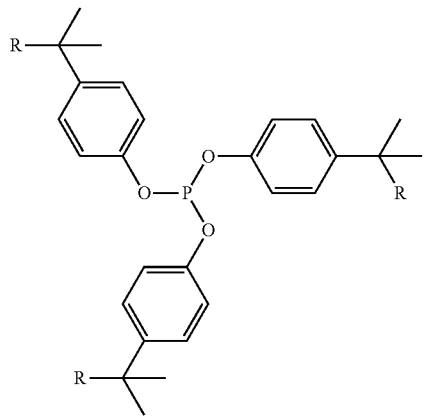

wherein each R is independently selected from $C_1$ to $C_5$ straight or branched chain alkyl.

Although alkanolamines have previously been recognised as functional hydrolytic stabilizers with respect to phosphite antioxidants it has not previously been recognised that highly active tris(monoalkylaryl)phosphites with relatively high phosphorus loadings (and relative lack of steric hindrance as compared to (dialkylaryl) and (trialkylaryl)phosphites) could effectively be stabilized against hydrolysis by relatively small amounts of alkanolamine, or that the stabilizing effect of the alkanolamine could reach through from the polymer stabilizing composition itself to the stabilized polymeric composition and therefore provide significant benefits not only in respect of pre-stabilization of the composition prior to blending with or incorporation otherwise into the polymeric composition, but also in relation to the stability (for example with respect to melt flow index, colour stability or gas fade properties) of the polymer itself.

In fact it seems likely that prior art attempts to provide antioxidant stability to polymeric compositions have overlooked the potential of antioxidant compositions comprising high (i.e. >95 wt %) loadings of tris(monoalkylaryl)phosphites because of the particular susceptibility of such materials to hydrolysis and their under-performance in this respect compared to other more sterically hindered (alkylaryl)phosphites. It may be for this reason that prior art efforts to provide antioxidant properties to polymeric compositions by the inclusion therein of (alkylaryl)phosphites have deliberately focused on the incorporation of (alkylaryl) phosphites other than tris(monoalkylaryl)phosphites or, where tris(monoalkylaryl)phosphites have been contemplated they have been so only at relatively low loadings of such materials with respect to total (alkylaryl)phosphite composition; and certainly not at loadings of greater than 95 wt %.

The precise phosphorus loading of the first component of the composition will depend upon the nature of the alkyl group, and indeed the aryl group, selected. However, in general terms the phosphorus loading of the first component may be greater than 5 wt %, for example greater than 5.5 wt %, greater than 5.9 wt %, greater than 6 wt % or even greater than 6.4 wt %. For example, when a tris(monobutylphenyl)phosphite is selected as the tris(monoalkylaryl)phosphite the phosphorus loading is ca. 6.5%. When a tris(monopentylphenyl)phosphite is selected as the tris(monoalkylaryl)phosphite the phosphorus loading is ca. 6%. It will be appreciated that the selected tris(monoalkylaryl) phosphite may optionally be used in the composition of the invention in combination with one or more other (alkylaryl)phosphites provided that the selected tris(monoalkylaryl)phosphite (or combination of tris (monoalkylaryl)phosphites) is present in the composition in an amount exceeding 95 wt % with respect to the total amount of alkylaryl phosphite present in the composition.

By "relatively small amounts of alkanolamine" is generally meant that the alkanolamine is present in an amount of from 0.01 to 10 wt % based on the total weight of phosphite antioxidants present in the composition or based on the total weight of (alkylaryl) phosphite present in the composition, but typically the amount will be significantly less than 10 wt % in either respect, as will be explained further below.

The alkanolamine may have the formula:

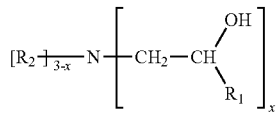

wherein x is from 1 to 3; $R_1$ is selected from the group consisting of hydrogen, and straight or branched $C_1$-$C_6$ alkyl, and $R_2$ is selected from the group consisting of straight or branched $C_1$-$C_{30}$ alkyl The stabilized polymeric or polymer compositions according to the invention may comprise polymers selected from polyolefins, polyamides, polystyrenes, polyesters, polycarbonates, biopolymers and compatible mixtures and blends comprising any two or more thereof. Stabilized polyolefins in accordance with the invention are of particular importance, and polypropylene and polyethylene especially so. The invention also concerns films, fibres and other articles formed from or comprising the stabilized polymeric or polymer composition of the invention.

The invention also provided a method for stabilizing a polymeric composition with respect to the stability of the polymeric composition during or following melt processing thereof, the stability of the polymeric composition being at least qualitatively measurable by means of the measurement or determination or assessment of one or more properties of the polymeric composition selected from melt flow index, yellowness index and/or gas fade properties, the method comprising blending with or otherwise incorporating into the polymeric composition prior to or during melt processing thereof a polymer stabilising composition as described herein.

Also provided in accordance with the invention is a polymeric composition prepared according to the aforesaid method, and films, fibres or other articles formed from or comprising the resulting prepared polymeric composition.

Polymer compositions comprising tris(monoalkylaryl) phosphites, for example tris(4-mono-t-butylphenyl)phosphite, are known, but, despite the higher level of phosphorus relative to, e.g., tris(2,4-di-t-butylphenyl)phosphite, tris(4-mono-t-butylphenyl) phosphite finds little commercial use in polymers such as polyolefins. U.S. Pat. No. 7,468,410, incorporated herein by reference, presents data obtained by multiply extruding linear low density polyethylene compositions containing sec-butylphenyl phosphites and t-butylphenyl phosphites. The tables therein provide melt flow data, YI data and Gas Fade data for the sterically hindered ortho substituted tris(2-t-butylphenyl)phosphite (Phos 2) and tris(2,4-di-t-butylphenyl)phosphite (Phos 6) and the non-sterically hindered tris(4-t-butylphenyl)phosphite (Phos 4). The data presented show that tris(2-t-butylphenyl)phosphite and tris(2,4-t-butylphenyl)phosphite appear to provide greater benefits than the highly similar tris(4-tert-butylphenyl)phosphites when used as a stabilizer for melt processing of polyethylenes.

It has now been found that the addition of a small amount of a select hydroxyalkyl amine to a tris(monoalkylaryl)phosphite such as a tris(p-t-alkylphenyl)phosphite, e.g. tris(4-t-butylphenyl)phosphite and tris(4-t-amylphenyl)phosphite, provides a phosphite composition that not only outperforms the same tris(p-t-alkylphenyl)phosphite which has not been treated with the amine, but also outperforms other, more inherently stable phosphites when used in the melt processing of polymers.

For example, the addition of less than 5 wt %, for example less than 1 wt %, such as 0.75 wt %, based on the weight of phosphite, of tris-isopropanolamine to tris(4-t-butylphenyl) phosphite creates a phosphite composition that not only provides a polymer resin with better melt flow stability, less melt processing color, and less discoloration due to gas fading than tris(4-t-butylphenyl)phosphite without tris-isopropanolamine, it also provides better processing color and gas fade results than the commercially ubiquitous tris(2,4-di-t-butylphenyl) phosphite.

Consequently we find that a solid phosphite composition comprising a tris(monoalkylaryl)phosphite such as a tris(4-alkylphenyl)phosphite and a selected hydroxyalkyl amine provides superior protection, relative to commonly used commercial additives, against thermal degradation of polymers during processing and excellent stabilization during storage, for example, protection against discoloration due to deleterious gasses during storage, i.e., "gas fading". The composition can be used to stabilize a wide variety of polymer resins. Excellent results are achieved in the stabilization of, e.g., polyolefins such as polyethylene and polypropylene homopolymers and copolymers.

The solid phosphite composition of the invention may comprise:

(a) one or more phosphite antioxidants comprising a tris (monoalkylphenyl)phosphite wherein greater than 95% by weight of all tris(phenyl) phosphite antioxidants alkylated at the ortho- and/or para-position relative to the phenoxy-phosphorus bond is one or more tris(4-monoalkylphenyl)phosphite of formula (I):

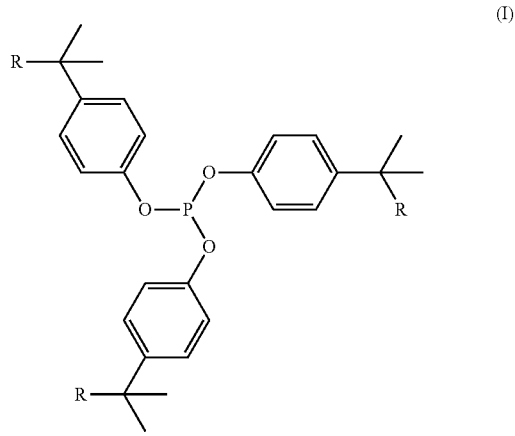

wherein each R is independently selected from $C_1$ to $C_5$ straight or branched chain alkyl; and (b) one or more amines of formula (II):

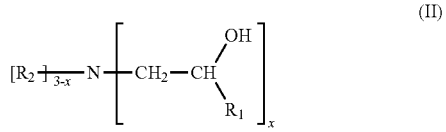

wherein x is from 1 to 3; $R_1$ is selected from the group consisting of hydrogen, and straight or branched $C_1$-$C_6$ alkyl, and $R_2$ is selected from the group consisting of straight or branched $C_1$-$C_{30}$ alkyl, wherein the amine is present in an amount of from 0.01 to 10 wt % based on the total weight of phosphite antioxidants, and wherein the composition comprising (a) and (b) is a solid at 25° C.

Also provided are polymer compositions comprising a polymer and the composition as described above, and a method of improving the thermal processing of polymer compositions known to be stabilized by phosphite antioxidants wherein the present solid phosphite composition is employed as the phosphite antioxidant. When adding the present phosphite composition to a polymer the composition can be added as premixed phosphite and amine, or the phosphite and amine components can be added separately.

The solid phosphite composition can be used in any thermally processed polymer, including thermoplastic and elastomeric polymers, and excellent results are obtained with, e.g., polyolefins, polystyrenes, rubbers and the like, where excellent melt flow and color properties are obtained.

Surprisingly, compositions of the present invention, e.g., compositions comprising one of the amines of component (b) and e.g., tris(4-t-butylphenyl)phosphite and/or tris(4-t-amylphenyl)phosphite are shown to outperform compounds such as the widely used tris(2,4-di-t-butylphenyl)phosphite and the like in the stabilization of polymers, for example polyolefins.

DESCRIPTION OF THE INVENTION

The phosphites of formula (I) of the invention are solid tris(alkylphenyl) phosphites wherein each phenyl ring is mono-substituted with a tertiary alkyl group at the para-position relative to the phenoxy bond to phosphorous. In many embodiments, R is selected from the group consisting of methyl, ethyl, propyl, 2-methylpropyl and 2,2-dimethylpropyl.

There is no general requirement that each R be the same, but often in each of the one or more phosphites of formula (I) each of the R groups will be the same. For example, the one or more phosphites of formula (I) may be selected from tris(4-t-butylphenyl)phosphite, tris(4-t-amylphenyl)phosphite, tris(4-t-octylphenyl)phosphite and the like. Typically the one or more phosphite of formula (I) is tris(4-t-butylphenyl)phosphite, tris(4-t-amylphenyl)phosphite or a mixture of the two.

In many embodiments other phosphite antioxidants will be present. Many such phosphites are known as seen in the above cited patents, such as trisalky phosphites, tris aryl phosphites, phosphites substituted by alkyl and aryl groups, cyclic phosphites, polycyclic phosphites etc. However, while other alkylated phenyl phosphites may be present in the composition, greater than 95%, e.g., 96%, 97%, 98%, 99% or more by weight of all tris(phenyl) phosphite antioxidants alkylated at the ortho- and/or para-position relative to the phenoxy-phosphorus bond is a tris(monoalkylphenyl)phosphite of formula (I). In many embodiments at least 60, 70, 80, 90, or 95 wt %, e.g., 96 to 100%, of all phosphite antioxidants present in the composition are compounds of formula (I). Often, greater than 95 wt % of all phosphites in the composition are compounds of formula (I).

The compositions can also contain, along with the phosphites of formula (I), meta-alkylphenyl phosphites, e.g., tris (3-t-butylphenyl)phosphite, tris(3-n-butylphenyl) phosphite, tris(2,4alkylphenyl)phosphite etc. However, some meta-alkylphenyl phosphites are liquid and care must be taken to avoid a quantity of these phosphites that would generate a liquid as the phosphite/amine composition of the invention is a solid.

The para-t-alkylphenyl compounds of formula (I) useful in the invention have the characteristics that they are solid, not hindered at the Ph-O—P bond by substitution on adjacent carbon atoms, are highly active phosphite antioxidants, and are hydrolytically stable in the presence of amine (b). The phosphites also have a high phosphorus content, especially tris(4-t-butylphenyl)phosphite, which is 6.4% phosphorus, or tris(4-t-amylphenyl)phosphite, which is about 6% phosphorus. Given these advantageous characteristics, in many embodiments the phosphites of formula (I) are the predominate phosphites in the composition, e.g., 90 wt %, 95 wt % or greater than 95% of all phosphite antioxidants are phosphites of formula (I).

In many embodiments, the amine (b) is one or more compounds of formula (II) wherein each $R_1$ is independently selected from the group consisting of hydrogen, straight or branched $C_1$-$C_3$ alkyl and $R_2$ is a straight or branched $C_8$-$C_{20}$ alkyl group.

For example, the amine of formula (II) is often selected from the group consisting of triethanolamine, tripropanolamine, triisopropanolamine, octyl-bis(2-ethanol)amine, nonyl-bis(2-ethanol)amine, decyl-bis(2-ethanol)amine, undecyl-bis(2-ethanol)amine, dodecyl-bis(2-ethanol)amine, tridecyl-bis(2-ethanol)amine, tetradecyl-bis(2-ethanol) amine, pentadecyl-bis(2-ethanol)amine, hexadecyl-bis(2-ethanol)amine, heptadecyl-bis(2-ethanol)amine, octadecyl-bis(2-ethanol)amine, octyl-bis(2-propanol)amine, nonyl-bis (2-propanol)amine, decyl-bis(2-propanol)amine, undecyl-bis(2-propanol)amine, dodecyl-bis(2-propanol)amine, tridecyl-bis(2-propanol)amine, tetradecyl-bis(2-propanol) amine, pentadecyl-bis(2-propanol)amine, hexadecyl-bis(2-propanol)amine, heptadecyl-bis(2-propanol)amine, octadecyl-bis(2-propanol)amine, and isomers thereof.

For example, the amine component (b) is selected from the group consisting of triethanolamine, tripropanolamine and triisopropanolamine.

Typically the amine (b) is present in the composition an amount of from 0.05 to 5 wt % based on the total weight of phosphite antioxidants, for example, from 0.1 to 3 wt % or from 0.1 to 1% based on the total weight of phosphite antioxidants. That is, the amine of formula (II) is present in an amount of at least 0.01%, 0.05%, or 0.1% by weight based on the amount of phosphites present, and no more than 10%, typically no more than 5%, and in many embodiments no more than 3% or 1% by weight based on the amount of phosphites present.

The phosphites of formula (I) and the amines of formula (II) are commercially available or prepared by standard means.

Certain specific embodiments of the invention relate to a solid phosphite composition and its use in stabilizing polymer resins wherein the solid phosphite composition comprises (a) tris(4-t-butylphenyl)phosphite and/or tris(4-t-amylphenyl)

phosphite wherein greater than 95% by weight of all tris (phenyl)phosphite antioxidants alkylated at the ortho- and/or para-position relative to the phenoxy-phosphorus bond is -(4-t-butylphenyl)phosphite and/or tris(4-t-amylphenyl)phosphite and (b) and amine of formula (II) wherein the amine is present in an amount of from 0.01 to 3 wt %, or from 0.05 to 1.5 wt %, e.g., from 0.5 to 1.5 wt % based on the total weight of phosphite antioxidants, and wherein the composition comprising (a) and (b) is a solid at 25° C.

For example, a solid phosphite composition comprising (a) tris(4-t-butylphenyl)phosphite and/or tris(4-t-amylphenyl) phosphite wherein greater than 95% by weight of all tris (phenyl)phosphite antioxidants alkylated at the ortho- and/or para-position relative to the phenoxy-phosphorus bond is -(4-t-butylphenyl)phosphite and/or tris(4-t-amylphenyl)phosphite and (b) and amine selected from triethanolamine, tripropanolamine and triisopropanolamine wherein the amine is present in an amount of from 0.01 to 10 wt %, from 0.05 to 5 wt %, from 0.1 to 3 wt % or from 0.5 to 1.5 wt % based on the total weight of phosphite antioxidants.

For example, a solid phosphite composition comprising (a) tris(4-t-butylphenyl)phosphite and/or tris(4-t-amylphenyl)phosphite wherein 70%, 80%, 90%, 95%, 96%, 97%, 98% 99% or more by weight of all phosphite antioxidants is tris-(4-t-butylphenyl)phosphite and/or tris(4-t-amylphenyl) phosphite, and (b) and amine of formula (II), for example, triethanolamine, tripropanolamine and/or triisopropanolamine wherein the amine is present in an amount of from 0.01 to 10 wt %, from 0.05 to 5 wt %, from 0.1 to 3 wt % or from 0.5 to 1.5 wt % based on the total weight of phosphite antioxidants or based on the total weight of (alkylaryl)phosphite present in the compostion, and wherein the composition comprising (a) and (b) is a solid at 25° C.

Compositions of the invention, for example compositions wherein the one or more phosphite antioxidant (a) is predominately tris(4-t-butylphenyl)phosphite and/or tris(4-t-amylphenyl)phosphite and the amine of formula (II) is present in an amount of from 0.5 to 1 wt %, are more effective than similar compositions comprising tris(2,4-di-t-butylphenyl) phosphite as the sole or predominate phosphite antioxidant. This is particularly surprising, especially in light of U.S. Pat. No. 7,468,410 which showed tris(2,4-di-t-butylphenyl)phosphite to be far more effective than tris(4-t-butylphenyl)phosphite when used without the hydroxyalkyl amine.

That is, the Examples found in U.S. Pat. No. 7,468,410 present melt flow, YI and Gas Fade data from multiple extrusions of linear low density polyethylene compositions containing various sec-butylphenyl phosphites and t-butylphenyl phosphites loaded at equivalent phosphorus levels. Each formulation also contains 500 ppm octadecyl (4-hydroxy-3,5-di-tert-butyl-phenyl) propionate. Tris(2-t-butylphenyl)phosphite and tris(2,4-di-t-butylphenyl) phosphite are shown in U.S. Pat. No. 7,468,410 to provide similar melt flow and gas fade performance and each is shown to provide better melt flow and gas fade performance than tris(4-t-butylphenyl) phosphite. The examples of U.S. Pat. No. 7,468,410 do not contain the hydroxyalkyl amine component of the present inventive composition. The melt flow and gas fade data from U.S. Pat. No. 7,468,410 for compositions containing 888 ppm tris(2,4-di-t-butylphenyl)phosphite and 657 ppm tris(4-t-butylphenyl)phosphite are shown here:

| U.S. Pat. No. 7,468,410, Melt Flow Rate, 190° C., 2.16 kg | | | |
|---|---|---|---|
| | Extrusion pass # | | |
| | 1 | 3 | 5 |
| tris(2,4-di-t-butylphenyl) phosphite | 0.99 | 0.88 | 0.84 |
| tris(4-t-butylphenyl) phosphite | 0.90 | 0.75 | 0.67 |

| | Color, YI, Day | | | |
|---|---|---|---|---|
| U.S. Pat. No. 7,468,410, Gas Fade | 0 | 7 | 14 | 21 |
| tris(2,4-di-t-butylphenyl) phosphite | 1.34 | 2.31 | 2.80 | 3.31 |
| tris(4-t-butylphenyl) phosphite | 1.22 | 5.71 | 8.25 | 8.07 |

However, when tris(4-t-butylphenyl)phosphite is combined with tri-isopropanolamine amine (TiPA) according to the present invention, the resulting phosphite composition provides equivalent melt flow activity and vastly improved gas fade activity relative to tris(2,4-di-t-butylphenyl)phosphite when loaded at equivalent phosphorus levels in a polyolefin similar to that of U.S. Pat. No. 7,468,410. As above each formulation also contains 500 ppm octadecyl (4-hydroxy-3,5-di-tert-butyl-phenyl)propionate. The melt flow and gas fade data from U.S. Pat. No. 7,468,410 for compositions containing 1500 ppm tris(2,4-di-t-butylphenyl)phosphite and 1100 ppm of a composition comprising tris(4-t-butylphenyl)phosphite +0.75 TiPA are shown here:

| Melt Flow Rate, 190° C., 2.16 kg | | | | |
|---|---|---|---|---|
| | | Extrusion pass # | | |
| | | 1 | 3 | 5 |
| tris(2,4-di-t-butylphenyl) phosphite | 1500 ppm | 0.95 | 0.93 | 0.90 |
| tris(4-t-butylphenyl) phosphite + 0.75% TiPA | 1100 ppm | 0.97 | 0.96 | 0.93 |

| Gas Fade | | | | |
|---|---|---|---|---|
| | Color, YI, Day | | | |
| | 0 | 11 | 18 | 28 |
| tris(2,4-di-t-butylphenyl) phosphite | −0.51 | 2.52 | 3.78 | 4.47 |
| tris(4-t-butylphenyl) phosphite + 0.75% TiPA | −1.22 | −0.74 | −0.55 | 0.05 |

While amines such as tri-isopropanolamine have been added to phosphites to slow or prevent hydrolysis, there is no reason for one to imagine that the addition of less than 1 wt % of the hydroxyalkyl amine of the invention to the phosphite of formula (I) would produce a stabilizing composition capable of significantly outperforming compounds such as tris(2,4-di-t-butylphenyl)phosphite, which was previously shown to outperform said phosphite of formula (I) in the absence of the hydroxyalkyl amine.

The phosphite/hydroxyalkyl amine compositions represent one general embodiment of the invention. Improved methods for stabilizing polymer compositions using the inventive compositions are another general embodiment, for example, a method wherein the polymer composition comprising the solid phosphite composition is melt processed at a temperature above 125° C., 150° C., 175° C., 200° C., 220° C., or 240° C.

The invention further provides stabilized thermoplastic compositions, comprising a base polymer (e.g., polymer resin) and any of the aforementioned phosphite compositions of the invention. As is common with stabilized polymer compositions, other stabilizers or additives may be incorporated along with the present phosphite composition. For example, the solid phosphite composition is typically used with a co-stabilizer, for example, antioxidants such as hindered phenolics, aromatic amines, hydroxylamines, lactones, tertiary amine oxides, thioethers etc., and may also be used with one or more additional stabilizers or additives such as hindered amine light stabilizers (HALS), the ultraviolet light absorbers, alkaline metal salts of fatty acids, hydrotalcites, metal oxides, epoxidized soybean oils, colorants, flame retardants etc. Other phosphites or phosphonites may also be used but only in accordance with the limitations defined above regarding the amounts of phosphites of formula (I).

When adding the present phosphite/hydroxyalkyl amine composition to a polymer, the composition may be added as a mixture, or the individual phosphite and amine components which make up the phosphite amine/composition as described above can be added separately. Likewise, other optional components may be blended with the phosphite and/or hydroxyalkyl amine prior to incorporation into the polymer, or may be added separately.

The solid phosphite compositions can be used in almost any thermoplastic, elastomeric or thermoset polymer known in the art, such as polyolefin homopolymers and copolymers, thermoplastics, rubbers, polyesters, polyurethanes, polyalkylene terephthalates, polysulfones, polyimides, polyphenylene ethers, styrenic polymers and copolymers, polycarbonates, acrylic polymers, polyamides, polyacetals, halide-containing polymers, and biodegradable polymers. Mixtures of different polymers, such as polyphenylene ether/styrenic resin blends, polyvinyl chloride/ABS or other impact modified polymers, such as methacrylonitrile and α-methylstyrene containing ABS, and polyester/ABS or polycarbonate/ABS etc. Such polymers are available commercially or may be made by means well known in the art.

Examples of many of these polymers are found in references cited above, for example, polyolefins, polycarbonates, PVC, polyesters, polyalkylene terephthalates, polyphenylene ethers and styrenic polymers, polyamides, ABS-type graft copolymers, biodegradable polymers etc. and mixtures and co-polymers thereof.

The stabilizer compositions of the invention are particularly useful in thermoplastic polymers, such as polyolefins (for example, polyethylenes, polypropylenes), polycarbonates, polyalkylene terephthalates, polyphenylene ethers, styrenic polymers and high performance polystyrenes, often due to the extreme temperatures at which thermoplastic polymers are often processed and/or used.

Certain particular embodiments of the invention relate to polyolefin compositions and methods for stabilizing polyolefin compositions.

Polyolefins are of course well known polymers and examples include polymers of monoolefins and diolefins, copolymers of monoolefins and diolefins with each other and copolymers of monoolefins and diolefins with other vinyl monomers.

For example ethylene, polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Copolymers of monoolefins and diolefins with each other or with other vinyl monomers include, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

Mixtures of polyolefin polymers include, for example, mixtures of polypropylene with polyisobutylene, polypropylene with polyethylene (for example PP/HDPE, PP/LDPE) and mixtures of different types of polyethylene (for example LDPE/HDPE).

Blends of polyolefins include, for example blends with impact modifiers such as ethylene-propylene-diene monomer copolymers (EPDM), copolymers of ethylene with higher alpha-olefins (such as ethylene-octene copolymers), polybutadiene, polyisoprene, styrene-butadiene copolymers, hydrogenated styrene-butadiene copolymers, styrene-isoprene copolymers, hydrogenated styrene-isoprene copolymers. These blends are commonly referred to in the industry as TPO's (thermoplastic polyolefins).

Such polymers are produced using a variety of polymerization processes including solution, high-pressure, slurry and gas phase using various catalysts including Ziegler-Natta, single-site, metallocene or Phillips-type catalysts.

In particular embodiments, the polyolefins are for example polypropylene homo- and copolymers and polyethylene homo- and copolymers, such as polypropylene, high density polyethylene (HDPE), linear low density polyethylene (LLDPE) and polypropylene random and impact (heterophasic) copolymers.

The stabilized polymer composition may also contain any common stabilizer, additive or processing aid. Common optional additives include hindered phenolic antioxidants, hindered amine light stabilizers, Ultra Violet light absorbers, hydroxylamine stabilizers, amine oxide stabilizers, benzofuranone stabilizers, other organic phosphorus stabilizers, thiosynergists such as dilaurythiodipropionate or distearylthiodipropionate. nucleating agents, fillers and reinforcing agents, dispersing agents, processing agents, plasticizers, lubricants, emulsifiers, pigments, dyes, optical brighteners, rheology additives, catalysts, flow-control agents, slip agents, crosslinking agents, crosslinking boosters, halogen scavengers, acid scavengers, smoke inhibitors, flameproofing agents, antistatic agents, clarifiers, blowing agents etc. Many examples of common polymer additives useful as the present optional additives are found in the art cited above.

As stated above, the composition may contain additional phosphites and/or phosphonites, for example, triphenyl phosphite, diphenylalkyl phosphites, phenyldialkyl phosphites, tris(nonyl-phenyl)phosphite, trilauryl phosphite, trioctadecyl phosphite, distearyl pentaerythritol diphosphite, tris(2,4-di-t-butylphenyl)phosphite, diisodecyl pentaerythritol diphosphite, bis(2,4-di-t-butylphenyl)pentaerythritol diphosphite tristearyl sorbitol triphosphite, bis(2,4-dicumylphenyl)pentaerythritol diphosphite, and tetrakis(2,4-di-t-butylphenyl)-4,4'-biphenylene diphosphonite.

Examples of other specific co-additives include, for example, (i) Alkylated monophenols, for example: 2,6-di-t-butyl-4-methylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2,6-bis($\alpha$-methylbenzyl)-4-methylphenol, 2-($\alpha$-methylcyclohexyl)-4,6-dimethylphenol, 2,6-dioctadecyl-4-methylphenol, 2,4,6,-tricyclohexyphenol, and 2,6-di-t-butyl-4-methoxymethylphenol.

(ii) Alkylated hydroquinones, for example, 2,6-di-t-butyl-4-methoxyphenol, 2,5-di-t-butyl-hydroquinone, 2,5-di-t-amyl-hydroquinone, and 2,6-diphenyl-4-octadecyloxyphenol.

(iii) Hydroxylated thiodiphenyl ethers, for example, 2,2'-thio-bis-(6-t-butyl-4-methylphenol), 2,2'-thio-bis-(4-octylphenol), 4,4'-thio-bis-(6-t-butyl-3-methylphenol), and 4,4'-thio-bis-(6-t-butyl-2-methyphenol).

(iv) Alkylidene-bisphenols, for example, 2,2'-methylene-bis-(6-t-butyl-4-methylphenol), 2,2'-methylene-bis-(6-t-butyl-4-ethylphenol), 2,2'-methylene-bis-(4-methyl-6-(.alpha.-methylcyclohexyl)phenol), 2,2'-methylene-bis-(4-methyl-6-cyclohexylphenol), 2,2'-methylene-bis-(6-nonyl-4-methylphenol), 2,2'-methylene-bis-(6-nonyl-4-methylphenol), 2,2'-methylene-bis-(6-($\alpha$-methylbenzyl)-4-nonylphenol), 2,2'-methylene-bis-(6-($\alpha,\alpha$-dimethylbenzyl)-4-nonyl-phenol), 2,2'-methylene-bis-(4,6-di-t-butylphenol), 2,2'-ethylidene-bis-(6-t-butyl-4-isobutylphenol), 4,4'-methylene-bis-(2,6-di-t-butylphenol), 4,4'-methylene-bis-(6-t-butyl-2-methylphenol), 1,1-bis-(5-t-butyl-4-hydroxy-2-methylphenol)butane, 1,1-bis(2-methyl-4-hydroxy-5-t-butylphenyl)butane, 2,2'-isobutylidene-bis(4,6-dimethylphenol), 2,6-di-(3-t-butyl-5-methyl-2-hydroxybenzyl)-4-methylphenol, 1,1,3-tris(5-t-butyl-4-hydroxy-2-methylphenyl)butane, 1,1-bis-(5-t-butyl-4-hydroxy-2-methylphenyl)-3-dodecyl-mercaptobutane, ethyleneglycol-bis-(3,3,-bis-(3'-t-butyl-4'-hydroxyphenyl)-butyrate)-di-(-3-t-butyl-4-hydroxy-5-methylphenyl)-dicyclopentadiene, and di-(2-(3'-t-butyl-2'hydroxy-5'methyl-benzyl)-6-t-butyl-4-methylphenyl(terephthalate).

(v) Benzyl compounds, for example, 1,3,5-tris(3,5-di-t-butyl-4-hydroxybenzyl)-2,4,6-trimethylbenzene, bis-(3,5-di-t-butyl-4-hydroxybenzyl)sulfide, isooctyl 3,5-di-t-butyl-4-hydroxybenzyl-mercapto-acetate, bis-(4-t-butyl-3-hydroxy-2,6-dimethylbenzyl)dithiol-terephthalate, 1,3,5-tris (3,5-di-t-butyl-4 hydroxybenzyl)isocyanurate, 1,3,5-tris(4-t-butyl-3-hydroxy-2,6-dimethylbenzyl)isocyanurate, 1,3,5-tris(4-t-butyl-3-hydroxy-2,6-dimethylbenzyl)-1,3,5-Triazine-2,4,6-(-1H,3H, 5H)-trione, dioctadecyl-3,5-di-t-butyl-4-hydroxybenzyl-phosphonate, calcium salt of monoethyl 3,5-di-t-butyl-4-hydroxybenzylphosphonate, 1,3, 5-tris(3,5-dicyclohexyl-4-hydroxybenzyl)isocyanurate.

(vi) Acylaminophenols, for example, 4-hydroxylauric acid anilide, 4-hydroxy-stearic acid anilide, 2,4-bis-octylmercapto-6-(3,54-butyl-4-hydroxyanilino)-s-triazine, and octyl-N-(3,5-di-t-butyl-4-hydroxyphenyl)-carbamate.

(vii) Esters of beta-(3,5-di-t-butyl-4-hydroxyphenol)-propionic acid with monohydric or polyhydric alcohols, for example, methanol, diethyleneglycol, octanol, octadecanol, triethyleneglycol, 1,6-hexanediol, pentaerythritol, neopentylglycol, trishydroxyethylisocyanurate, thiodiethyleneglycol, di-hydroxyethyl oxalic acid diamide. Such phenols also include tetrakis[methylene {3,5-di-t-butyl-4-hydroxycinnamate}]methane.

(viii) Thio esters of beta-(5-t-butyl-4-hydroxy-3-methylphenyl)-propionic acid with monohydric or polyhydric alcohols, for example, methanol, diethyleneglycol, octadecanol, triethyleneglycol, 1,6-hexanediol, pentaerythritol, neopentylglycol, trishydroxyethyl isocyanurate, thiodiethyleneglycol, dihydroxyethyl oxalic acid diamide.

(ix) Amides of beta-(3,5-di-t-butyl-4-hydroxyphenol)-propionic acid for example, N,N'-di-(3,5-di-t-butyl-4-hydroxyphenylpropionyl)-hexamethylene-diamine, N,N'-di-(3,5-di-t-butyl-4-hydroxyphenylpropionyl)trimethylenediamine, N,N'-di-(3,5-di-t-butyl-4-hydroxyphenylpropionyl)-hydrazine, N,N'-Hexamethylene bis[3-(3,5-di-t-butyl-4-hydroxyphenyl)propionamide, and 1,2-Bis(3,5-di-t-butyl-4-hydroxyhydrocinnamoyl)hydrazine.

(x) Other phenolic antioxidants include the following phenols. Polymeric phenols such as the reaction product of 4-methylphenol with dicyclopentadiene and isobutylene. Alkylidene-poly-phenols, such as 1,3 tris(3-methyl-4-hydroxyl-5-t-butyl-phenyl)-butane. Thio phenols such as 2,6-di-t-butyl-4-(4,6-bis(octylthio)-1,3,5-triazin-2-ylamino)phenol, 4,6-bis(octylthiomethyl)-o-cresol; 4,6-bis(dodecylthiomethyl)-o-cresol. Ester phenols include bis[3,3-bis(4-hydroxy-3-t-butyl phenyl)butanoic acid]glycol ester. Still other phenols include 2-[1-(2-hydroxy-3,5-di-tert-pentylphenypethyl]-4,6-di-tert-pentylphenyl acrylate.

(xi) Hydroxylamines, such as bis(octadecyl)hydroxylamine.

(xii) 2-(hydroxyphenyl)-benzotriazoles, for example, 5'-methyl-, 3'5'-di-t-butyl-, 3'5'-di-t-amyl-, 5'-t-butyl-, 5'-t-amyl-, 5'(1,1,3,3-tetramethylbutyl)-, 5-chloro-, 3',5'-di-t-butyl-, 5-chloro-3'-t-butyl-5'methyl-, 3'-sec-butyl-5't-butyl-,4'-octoxy, 3',5'-di-t-amyl-, and 3',5'-bis-($\alpha,\alpha$-dimethylbenzyl)-derivatives.

(xiii) 2-Hydroxy-benzophenones, for example, the 4-hydroxy, 4-methoxy-, 4-octoxy, 4-decyloxy-, 4-dodecyloxy-, 4-benzyloxy-, 2,4-dihydroxy-, 4',4'-trihydroxy- and 2'-hydroxy-4,4'-dimethoxy-derivative. Exemplary 2-hydroxybenzophenones include 2-hydroxy-4-methoxybenzophenone, 2-hydroxy-4-ethoxybenzophenone, 2,4-dihydroxybenzophenone, and 2-hydroxy-4-propoxybenzophenone.

(xiv) Esters of substituted and unsubstituted benzoic acids for example, phenyl salicylate, 4-t-butylphenyl-salicilate, octylphenyl salicylate, dibenzoylresorcinol, bis-(4-t-butylbenzoyl)-resorcinol, benzoylresorcinol, 2,4-di-t-butyl-phenyl-3,5-di-t-butyl-4-hydroxybenzoate and hexadecyl-3,5-di-t-butyl-4-hydroxybenzoate.

(xv) acrylate UV absorbers, for example, $\alpha$-cyano-beta, beta-diphenylacrylic acid-ethyl ester or isooctyl ester, alpha-carbomethoxy-cinnamic acid methyl ester, alpha-cyano-beta-methyl-p-methoxy-cinnamic acid methyl ester or butyl ester, alpha-carbomethoxy-p-methoxy-cinnamic acid methyl ester, N-(beta-carbomethoxy-beta-cyano-vinyl)-2-methylindoline.

(xvi) Nickel compounds are also suitable UV absorbers and light stabilizers. Exemplary nickel compounds include nickel complexes of 2,2'-thio-bis(4-(1,1,1,3-tetramethylbutyl)-phenol), such as the 1:1 or 1:2 complex, optionally with additional ligands such as n-butylamine, triethanolamine or N-cyclohexyl-diethanolamine, nickel dibutyldithiocarbamate, nickel salts of 4-hydroxy-3,5-di-t-butylbenzylphosphonic acid monoalkyl esters, such as of the methyl, ethyl, or butyl ester, nickel complexes of ketoximes such as of 2-hydroxy-4-methyl-penyl undecyl ketoxime, nickel complexes of 1-phenyl-4-lauroyl-5-hydroxy-pyrazole, optionally with additional ligands.

(xvii) Sterically hindered amine light stabilizers, for example bis(2,2,6,6-tetramethylpiperidyl)-sebacate, bis-(1,2,2,6,6-pentamethylpiperidyl)-sebacate, n-butyl-3,5-di-t-butyl-4-hydroxybenzyl malonic acid bis(1,2,2,6,6-pentamethylpiperidyl)ester, condensation product of 1-hydroxyethyl-2,2,6,6-tetramethyl-4-hydroxy-piperidine and succinic acid, condensation product of N,N-(2,2,6,6-tetramethylpiperidyl)-hexamethylendiamine and 4-tert-octylamino-2,6-dichloro-1,3,5-s-triazine, tris(2,2,6,6-tetramethylpiperidyl)-nitrilotriacetate, tetrakis-(2,2,6,6-tetramethyl-4-piperidyl)-1,2,3,4-butane-tetra-carbonic acid, 1,1'(1,2-ethanediyl)-bis-(3,3,5,5-tetramethylpiperazinone). Such amines include hydroxylamines derived from hindered amines, such as di(1-hydroxy-2,2,6,6-tetramethylpiperidin-4-yl)sebacate: 1-hydroxy 2,2,6,6-tetramethyl-4-benzoxypiperidine; 1-hydroxy-2,2,6,6-tetramethyl-4-(3,5-di-t-butyl-4-hydroxy hydrocinnamoyloxy)-piperidine; and N-(1-hydroxy-2,2,6,6-tetramethyl-piperidin-4-yl)-epsiloncaprolactam.

(xviii) Oxalic acid diamides, for examples, 4,4'-dioctyloxy-oxanilide, 2,2'-di-octyloxy-5',5'-di-t-butyloxanilide, 2,2'-di-dodecyloxy-5',5'di-t-butyl-oxanilide, 2-ethoxy-2'-ethyl-oxanilide, N,N'-bis(3-dimethylaminopropyl)-oxalamide, 2-ethoxy-5-t-butyl-2'-ethyloxanilide and its mixture with 2-ethoxy-2'ethyl-5,4-di-t-butyloxanilide and mixtures of n- and p-methoxy—as well as of o- and p-ethoxy-disubstituted oxanilides.

(xix) Metal deactivators, for example, N,N'-diphenyloxalic acid diamide, N-salicylal-N'-salicyloylhydrazine, N,N'-bis-salicyloylhydrazine, N,N'-bis-(3,5-di-t-butyl-4-hydrophenylpropionyl)-hydrazine, salicyloylamino-1,2,4-triazole, bis-benzyliden-oxalic acid dihydrazide.

(xx) Peroxide scavengers, for example, esters of betathiodipropionic acid, for example the lauryl, stearyl, myristyl or tridecyl esters, mercaptobenzimidazole or the zinc salt of 2-mercaptobenzimidazole, zinc-dibutyldithiocaramate, dioctadecyldisulfide, pentaerythritoltetrakis-(beta-dodecylmercapto)-propionate.

(xxi) Basic co-stabilizers, including alkali metal salts and alkaline earth metal salts of higher fatty acids, for example, Ca stearate, calcium stearoyl lactate, calcium lactate, Zn stearate, Zn octoate, Mg stearate, Na ricinoleate and K palmirate, antimony pyrocatecholate or zinc pyrocatecholate.

(xxii) Nucleating and clarifying agents, such as, metal salts of 4-tert butylbenzoic acid, adipic acid, diphenylacetic acid, sorbitol and derivatives thereof, sodium benzoate, and benzoic acid.

(xiii) Aminoxy propanoate derivatives such as methyl-3-(N,N-dibenzylaminoxy)propanoate; ethyl-3-(N,N-dibenzylaminoxy)propanonoate; 1,6-hexamethylene-bis(3-N,N-dibenzylaminoxy)proponoate); methyl-(2-(methyl)-3 (N,N-dibenzylaminoxy)propanoate); octadecyl-3-(N,N-dibenzylaminoxy)propanoic acid; tetrakis(N,N-dibenzylaminoxy)ethyl carbonyl oxymethy)methane; octadecyl-3-(N,N-diethylaminoxy)-propanoate; 3-(N,N-dibenzylaminoxy)propanoic acid potassium salt; and 1,6-hexamethylene bis(3-(N-allyl-N-dodecyl aminoxy)propanoate).

The present phosphite compositions are added to the polymer resin in amounts of, for example, from about 0.01% to about 10%, e.g., about 0.01% to about 5% by weight, based on the weight of the polymer, from about 0.025% to about 1%, from about 0.05% to about 0.5% by weight, from about 0.01% to about 1%, about 0.01% to about 0.5%, about 0.025% to about 5%, or about 0.05% to about 5% by weight, based on the weight of the polymer to be stabilized. For example, the present phosphite/amine compositions are present at a level of less than about 3% by weight, based on the weight of the polymer, or from about 0.01% to about 2.5% by weight, or from about 0.01% to about 2% by weight, based on the weight of the polymer.

In other embodiments, the phosphite compositions mixture can be added to the polymer to form a masterbatch which contains the present phosphite esters and optional additives in a concentration of, for example, about 5% to about 60% by weight, e.g., about 10% or about 15% to about 60% by weight.

Optional stabilizers are employed at typical levels found in the art.

Optionally the polymer or polymeric resins may include from 5-50 wt %, e.g., 10-40 wt % or 15-30 wt % fillers and reinforcing agents, for example, calcium carbonate, silicates, glass fibers, asbestos, talc, kaolin, mica, barium sulfate, metal oxides and hydroxides, carbon black and graphite.

The phosphite/amine compositions of the invention and optional additives are readily incorporated into a polymer by conventional techniques at any convenient stage prior to the manufacture of shaped articles therefrom. Often the phosphite compositions of the invention are compounded into the polymer resin by melt blending to give polymer compositions that are further processed by other melt processing techniques. Melt processing techniques are known and include, for example, extrusion, co-kneading, pultrusion, injection molding, co-extrusion, fiber extrusion, fiber spinning, film extrusion (cast, blown, blowmolding), rotational molding, compression molding and the like.

The present phosphite compositions and optional further additives can be incorporated into the polymer to be stabilized in pure form or encapsulated in waxes, oils or polymers.

Stabilized polymer compositions of the invention are useful in such operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc. In addition to the above, the solid phosphite compositions are used in various rubber based products such as tires, barriers and the like.

A particular embodiment of the invention provides a polyolefin composition stabilized with the present solid phosphite composition formed into a film or fiber.

In one embodiment, the solid phosphite compositions are suitable and/or approved for use in polymers, preferably polyolefins, that are used in contact with beverages, foods and other human consumables.

Throughout the present disclosure, the article "a" can mean either one or more than one unless otherwise specified and percentages are weight % unless otherwise specified.

EXAMPLES

In the following examples:

P1 is Alkanox240, that is tris(2,4-di-t-butylphenyl)phosphite

TNPP is tris(nonylphenyl)phosphite

P2 is t-amyl liq, a liquid mixture of tris(4-t-amylphenyl)phosphite, bis(4-t-amylphenyl)(2,4-di-t-amylphenyl)phosphite; bis(2,4-di-t-amylphenyl)(4-t-amylphenyl)phosphite; and tris(2,4-di-t-amylphenyl)phosphite, as found e.g., in U.S. Pat. No. 8,008,383

P3 is t-butyl liq, a liquid mixture of tris(4-t-butylphenyl)phosphite, bis(4-t-butylphenyl)(2,4-di-t-butylphenyl)phosphite; bis(2,4-di-t-butylphenyl)(4-t-butylphenyl)phosphite; and tris(2,4-di-t-butylphenyl)phosphite, as found e.g., in U.S. Pat. No. 8,008,384

P4 is p-tAmPP is tris(4-t-amylphenyl)phosphite

P5 is p-tBuPP is tris(4-t-butylphenyl)phosphite

P6* is p-tBuPP is +0.75% TiPA

P7* is p-tAmPP is +0.75% TiPA

*P6 and P7 are polymer stabilizing compositions in accordance with the invention.

TiPA is trisisopropanolamine

IC-14 is tris(3,5-di-t-butyl-4-hydroxybenzyl)isocyanurate

Anox 20 is Tetrakismethylene(3,5-di-t-butyl-4-hydroxyhydrocinnamate)methane

DHT-4V is magnesium aluminum hydrotalcite

In these examples unless otherwise indicated:

Gas-fading was measured as set forth by AATCC 23 at a temperature of 60° C.;

The yellowness index (YI) was measured according to ASTM D1925; and

Melt flow rate was measured by ASTM-1238; 190° C./2.16 Kg).

Example 1

Polyethylene compositions were prepared by blending a metallocene linear low density polyethylene/hexene copolymer, i.e., m-LLDPE, d=0.918, $C_6$, 1MFI=1.0, with 500 ppm of the phenolic antioxidant, octadecyl (4-hydroxy-3,5-di-tert-butyl-phenyl)propionate, and 1500 ppm of the phosphite and phosphite/amine compositions as shown in table 1.

The formulations are melt compounded in a single screw extruder at 190° C. under nitrogen.

The hydrolytic stability of the phosphites on the compositions is tested by exposing the samples to 90% RH@40° C. and measuring the active phosphorus still present in the compositions at various intervals. The % retained active phosphorus is the amount of antioxidatively active phosphorus compounds present based on the amount originally added as determined by thoroughly extracting the compositions and analyzing the extracts by chromatography to determine the amounts of antioxidant phosphorus species present.

The results are shown in Table 1. It can be seen that the hindered, solid phosphite, tris(2,4-di-t-butylphenyl)phosphite, and the liquid blend containing it, Comp 6, are inherently hydrolytically stable relative to the other phosphites tested. The liquid phosphites TNPP and the t-amyl mixture, Comp 4 are somewhat less hydrolytically stable inherently, but when blended with 0.75 wt % tri-isopropanolamine exhibit stability after 5 weeks similar to tris(2,4-di-t-butylphenyl)phosphite under the test conditions.

Solid phosphites of the invention, tris(4-t-amylphenyl)phosphite and tris(4-t-butylphenyl)phosphite, exhibit extremely poor inherent hydrolytic stability, comp 8 and 10, but show a remarkable improvement upon addition of 0.75 wt % tri-isopropanolamine.

TABLE 1

Hydrolytic Stability

| | | | % Active Phosphorus @ 40° C. & 90% RH week: | | | | |
|---|---|---|---|---|---|---|---|
| Comp | Phosphite | ppm | 1 | 2 | 3 | 4 | 5 |
| 1 | P1 | 1500 | 100 | 98 | 98 | 99 | 99 |
| 2 | TNPP | 1500 | 100 | 100 | 92 | 92 | — |
| 3 | TNPP + 0.75 wt % TiPA | 1500 | 100 | 99 | 99 | 99 | — |
| 4 | P2 | 1500 | 100 | 98 | 98 | 95 | — |
| 5 | P2 + 0.75 wt % TiPA | 1500 | 98 | 100 | 100 | 98 | — |
| 6 | P3 | 1500 | 100 | — | 100 | 98 | 100 |
| 7 | P3 + 0.75 wt % TiPA | 1500 | 100 | 99 | 99 | — | 99 |
| 8 | P4 | 1500 | 100 | 31 | 0 | — | — |
| 9* | P7 | 1500 | 100 | — | 99 | — | 99 |
| 10 | P5 | 1500 | 85 | 0 | — | — | — |
| 11* | P6 | 1500 | 97 | 97 | 98 | 98 | 98 |

*Designates a composition of the invention

Example 2

Compositions of m-LLDPE from above, Comp 1, 3, 5, 7, 9* and 11* are multiply extruded on a single screw extruder at 230° C. Samples of first, third and fifth pass extrudate are collected and tested for melt flow retention and color formation. The initially compounded compositions of Example 1 are used as the 0 pass sample. In addition, samples from the first pass extrusion are tested for gas fade, i.e., color development during exposure to oxides of nitrogen at 60° C. All tests are run under standard industry conditions, as previously identified herein.

Melt flow retention was nearly identical for each composition tested.

Color formation during extrusion was determined from 1.5 mm thick test samples. As can be seen in Table 2, compositions containing liquid phosphite formulations 3, 5, and 7, and the solid phosphite formulations of the invention, 9* and 11* exhibit less color development during multiple pass extrusion than tris(2,4-di-t-butylphenyl)phosphite (P1).

TABLE 2

| | | Color, YI (1.5 mm) | | | | |
|---|---|---|---|---|---|---|
| | | Pass: | | | | |
| Example | Phosphite | 0 | 1 | 3 | 5 | delta 0-5 |
| 2.1 | P1 | −1.10 | 0.52 | 0.19 | 0.43 | 1.53 |
| 2.3 | TNPP + 0.75 wt % TiPA | −1.60 | −1.38 | −0.81 | −0.59 | 1.01 |
| 2.5 | P2 + 0.75 wt % TiPA | −1.62 | −1.20 | −0.65 | −0.51 | 1.11 |
| 2.7 | P3 + 0.75 wt % TiPA | −1.57 | −1.25 | −0.77 | −0.57 | 1.00 |
| 2.9* | P7 | −1.60 | −1.33 | −0.75 | −0.52 | 1.08 |
| 2.11* | P6 | −1.56 | −1.32 | −0.75 | −0.64 | 0.92 |

*Designates a composition of the invention

Gas fade results are shown in Table 3. As can be seen in Table 3, compositions containing liquid phosphite formulations 3 and 7, show a significant improvement over tris(2,4-di-t-butylphenyl)phosphite (P1), but the composition containing the solid phosphite formulation of the invention, 11*, exhibits even less color development.

TABLE 3

Color, YI (1.5 mm)

| Example | Phosphite | Days: 0 | 7 | 21 | 28 | delta 0-28 |
|---|---|---|---|---|---|---|
| 2.1 | P1 | −0.60 | 1.30 | 3.29 | 3.84 | 4.44 |
| 2.3 | TNPP + 0.75 wt % TiPA | −1.37 | −0.91 | −0.39 | −0.08 | 1.29 |
| 2.7 | P3 + 0.75 wt % TiPA | −1.25 | −1.07 | −0.67 | −0.20 | 1.05 |
| 2.9* | P7 | −1.4 | −0.89 | −0.54 | −0.28 | 1.14 |
| 2.11* | P6 | −1.34 | −1.05 | −0.86 | −0.54 | 0.80 |

*Designates a composition of the invention

Example 3

Polyethylene compositions similar to those above, but with the load levels of the phosphites altered to provide the same amount of phosphorous that is introduced by 1500 ppm of tris(2,4-di-t-butylphenyl)phosphite. The compositions were prepared by blending the same metallocene linear low density polyethylene/hexene copolymer, i.e., m-LLDPE, d=0.918, $C_6$, MFI=1.0, with 500 ppm of the phenolic antioxidant, octadecyl (4-hydroxy-3,5-di-tert-butyl-phenyl)propionate, and the amounts of phosphite and phosphite/amine compositions as shown in Table 4. The formulations are initially melt compounded in a single screw extruder at 190° C. under nitrogen and then extruded on a single screw extruder at 230° C. as in Example 2.

Melt flow retention was again extremely similar for each composition tested.

Color formation during multiple extrusion and Gas Fade data were obtained as above and the results shown in Table 4 and 5. Again, the compositions containing phosphite compositions of the invention, 9* and 11* significantly outperform those containing tris(2,4-di-t-butylphenyl)phosphite at equal phosphorus content.

TABLE 4

Color formed during extrusion

| Ex | Phosphite | ppm | Pass: 0 | 1 | 3 | 5 | delta 0-5 |
|---|---|---|---|---|---|---|---|
| 3.1 | P1 | 1500 | −1.10 | 0.52 | 0.19 | 0.43 | 1.53 |
| 3.7 | P3 + 0.75 wt % TiPA | 1180 | −1.63 | −1.50 | −1.13 | −0.78 | 0.85 |
| 3.9* | P7 | 1200 | −1.58 | −1.44 | −1.04 | −0.91 | 0.67 |
| 3.11* | P6 | 1100 | −1.53 | −1.28 | −0.71 | −0.48 | 1.05 |

*Designates a composition of the invention

TABLE 5

Gas Fade

Color, YI (1.5 mm)

| Example | Phosphite | ppm | Days: 0 | 11 | 18 | 28 | delta 0-28 |
|---|---|---|---|---|---|---|---|
| 3.1 | P1 | 1500 | −0.51 | 2.52 | 3.78 | 4.74 | 5.25 |
| 3.7 | P3 + 0.75 wt % TiPA | 1180 | −1.39 | −0.57 | −0.27 | 0.06 | 1.45 |
| 3.9* | P7 | 1200 | −1.43 | −1.00 | −0.82 | −0.30 | 1.13 |
| 3.11* | P6 | 1100 | −1.22 | −0.74 | −0.55 | 0.05 | 1.27 |

*Designates a composition of the invention

Example 4

Polyethylene compositions were prepared by blending a Ziegler Natta linear low density polyethylene/hexene copolymer, i.e., ZN-LLDPE, d=0.92, $C_6$, MFI=1.0, with 500 ppm of the phenolic antioxidant, octadecyl (4-hydroxy-3,5-di-tert-butyl-phenyl)propionate, 500 ppm of ZnO, and 1500 ppm of the phosphites a and phosphite/amine compositions as shown in Table 6.

The formulations are initially melt compounded in a single screw extruder at 190° C. under nitrogen and then multiply extruded on a single screw extruder at 230° C. Samples of first, third and fifth pass extrudate are collected and tested as in Example 2.

Melt flow retention was again extremely similar for each composition tested. Color formation during multiple extrusion and Gas Fade data are shown in Table 6 and 7. Again, the compositions containing phosphite compositions of the invention, 9* and 11* significantly outperform those containing tris(2,4-di-t-butylphenyl)phosphite and other comparative examples.

TABLE 6

Color formed during extrusion

Color, YI (1.5 mm)

| Example | Phosphite | Pass: 0 | 1 | 3 | 5 | delta 0-5 |
|---|---|---|---|---|---|---|
| 4.1 | P1 | −2.79 | −0.24 | 2.73 | 4.89 | 7.68 |
| 4.3 | TNPP + 0.75 wt % TiPA | −3.55 | −1.68 | 0.20 | 2.34 | 5.98 |
| 4.5 | P2 + 0.75 wt % TiPA | −3.57 | −2.12 | −0.18 | 1.80 | 5.37 |
| 4.7 | P3 + 0.75 wt % TiPA | −3.40 | −1.27 | −0.65 | 2.38 | 5.78 |
| 4.9* | P7 | −3.56 | −2.13 | −0.35 | 0.37 | 3.93 |
| 4.11* | P6 | −3.82 | −2.13 | −0.70 | 0.81 | 4.63 |

*Designates a composition of the invention

TABLE 7

Gas Fade

Color, YI (15 mm)

| Example | Phosphite | Days: 0 | 7 | 19 | 28 | delta 0-28 |
|---|---|---|---|---|---|---|
| 4.1 | P1 | −0.13 | 4.92 | 10.32 | 13.31 | 13.44 |
| 4.3 | TNPP + 0.75 wt % TiPA | −1.51 | 0.66 | −0.39 | 2.28 | 3.79 |

TABLE 7-continued

Gas Fade

| | | Color, YI (15 mm) | | | | |
|---|---|---|---|---|---|---|
| | | Days: | | | | |
| Example | Phosphite | 0 | 7 | 19 | 28 | delta 0-28 |
| 4.5 | P2 + 0.75 wt % TiPA | −1.99 | 0.18 | 1.97 | 3.15 | 5.14 |
| 4.7 | P3 + 0.75 wt % TiPA | −1.17 | 0.30 | 1.72 | 2.73 | 3.90 |
| 4.9* | P7 | −1.95 | −0.96 | 0.24 | 0.87 | 2.82 |
| 4.11* | P6 | −1.96 | −0.99 | 0.49 | 0.79 | 2.75 |

*Designates a composition of the invention

Example 5

Polypropylene compositions were prepared by blending a polypropylene homopolymer MFR=5 with 600 ppm of the phenolic antioxidant IC-14 or Anox 20, 1200 ppm of the phosphite/amine or equal phosphorus of the various phosphite/amine compositions as shown in Table 8 and 250 ppm DHT-4V. The formulations are initially melt compounded in a single screw extruder at 230° C. under nitrogen and then multiply extruded on a single screw extruder at 260° C. Samples of first, third and fifth pass extrudate are collected and tested for melt flow (Table 9) and YI (Table 10).

TABLE 8

| | 5a | 5b* | 5c* | 5d* | 5e* |
|---|---|---|---|---|---|
| Formulation | | | | | |
| DHT-4V | 250 | 250 | 250 | 250 | 250 |
| Anox-20 | 600 | 600 | 600 | 600 | 600 |
| IC-14 | | | | | |
| P1 | 1200 | | | | |
| P6* | | 900 | | 1200 | |
| P7* | | | 960 | | 1200 |
| MI-2 | | | | | |
| Compound | 5.691 | 5.676 | 5.723 | 5.836 | 5.829 |
| Pass 1 | 6.110 | 6.583 | 6.295 | 6.386 | 6.215 |
| Pass 3 | 7.306 | 7.262 | 7.299 | 6.998 | 7.057 |
| Pass 5 | 7.920 | 8.557 | 8.055 | 7.778 | 7.841 |

TABLE 9

| | 5f* | 5g* | 5h | 5i* | 5j* |
|---|---|---|---|---|---|
| Formulation | | | | | |
| DHT-4V | 250 | 250 | 250 | 250 | 250 |
| Anox-20 | | | | | |
| IC-14 | 600 | 600 | 600 | 600 | 600 |
| P1 | | | 1200 | | |
| P6* | | 900 | | 1200 | |
| P7* | 960 | | | | 1200 |
| MI-2 | | | | | |
| Compound | 6.002 | 6.346 | 6.138 | 5.954 | 6.044 |
| Pass 1 | 6.815 | 6.78 | 6.721 | 6.714 | 6.744 |
| Pass 3 | 7.829 | 8.133 | 7.379 | 7.641 | 7.722 |
| Pass 5 | 8.677 | 9.131 | 8.275 | 8.467 | 8.625 |

TABLE 10

| Color, YI | 5a | 5b* | 5c* | 5d* | 5e* |
|---|---|---|---|---|---|
| Compound | 1.751 | 1.207 | 1.161 | 1.021 | 0.991 |
| Pass 1 | 3.170 | 1.735 | 1.658 | 1.557 | 1.428 |
| Pass 3 | 4.798 | 2.415 | 2.298 | 1.984 | 2.091 |
| Pass 5 | 6.085 | 3.182 | 2.748 | 2.290 | 2.445 |

TABLE 10-continued

| Color, YI | 5f* | 5g* | 5h | 5i* | 5j* |
|---|---|---|---|---|---|
| Compound | 1.251 | 1.152 | 2.068 | 1.124 | 1.104 |
| Pass 1 | 1.711 | 1.648 | 4.232 | 1.611 | 1.650 |
| Pass 3 | 2.101 | 2.084 | 6.031 | 1.960 | 2.019 |
| Pass 5 | 2.489 | 2.497 | 7.015 | 2.248 | 2.317 |

*Designates a composition of the invention

Melt flow retention (Tables 8, 9) was again extremely similar for each composition tested. Color formation during multiple extrusion data are shown in Table 10. Again, the compositions containing phosphite compositions of the invention, P6 and P7 significantly outperform those containing tris(2,4-di-t-butylphenyl)phosphite.

What is claimed is:

1. A polymer stabilizing composition, comprising:
   (i) a first component comprising one or more phosphite antioxidants,
      wherein said one or more phosphite antioxidants comprise one or more solid tris(monoalkylaryl)phosphites, wherein the one or more solid tris(monoalkylaryl)phosphites is present in the composition at 100 wt % with respect to the total amount of alkylaryl phosphite present in the composition; and
   (ii) a second component comprising an alkanolamine,
   wherein the polymer stabilizing composition is a solid at 25° C.

2. The composition according to claim 1, wherein
   (a) the one or more phosphite antioxidants comprise one or more tris(phenyl)phosphite antioxidants alkylated at the ortho- or para-position relative to the phenoxy-phosphorus bond of tris(4-monoalkylphenyl)phosphite of formula (I):

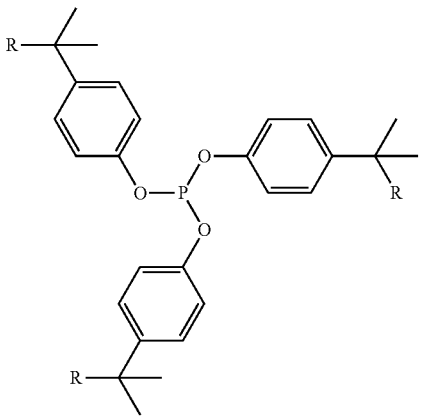

wherein each R is independently selected from $C_1$ to $C_5$ straight or branched chain alkyl;
   (b) the alkanolamine comprises one or more amines of formula (II):

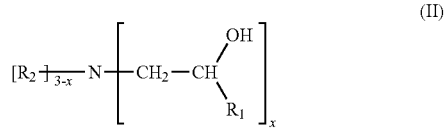

wherein x is from 1 to 3; $R_1$ is selected from the group consisting of hydrogen, and straight or branched $C_1$-$C_6$ alkyl, and $R_2$ is selected from the group consisting of straight or branched $C_1$-$C_{30}$ alkyl, wherein the amine is present in an amount of from 0.01 to 5 wt % based on the total weight of phosphite antioxidants, and the composition comprising (a) and (b) is a solid at 25° C.

3. The composition according to claim 2, wherein R is selected from the group consisting of methyl, ethyl, propyl, 2-methylpropyl and 2,2-dimethylpropyl.

4. The composition according to claim 2, wherein the at least one tris(4-monoalkylaryl)phosphite of formula (I) is selected from the group consisting of tris(4-t-butylphenyl) phosphate and tris(4-t-amylphenyl)phosphite.

5. The composition according to claim 2, wherein in the amine (b) each $R_1$ is independently selected from the group consisting of hydrogen, straight or branched $C_1$-$C_3$ alkyl and $R_2$ is a straight or branched $C_8$-$C_{20}$ alkyl group.

6. The composition according to claim 5 wherein the amine is selected from the group consisting of triethanolamine, tripropanolamine, triisopropanolamine, octyl-bis(2-ethanol) amine, nonyl-bis(2-ethanol)amine, decyl-bis(2-ethanol) amine, undecyl-bis(2-ethanol)amine, dodecyl-bis(2-ethanol) amine, tridecyl-bis(2-ethanol)amine, tetradecyl-bis(2-ethanol)amine, pentadecyl-bis(2-ethanol)amine, hexadecyl-bis(2-ethanol)amine, heptadecyl-bis(2-ethanol)amine, octadecyl-bis(2-ethanol)amine, octyl-bis(2-propanol)amine, nonyl-bis(2-propanol)amine, decyl-bis(2-propanol)amine, undecyl-bis(2-propanol)amine, dodecyl-bis(2-propanol) amine, tridecyl-bis(2-propanol)amine, tetradecyl-bis(2-propanol)amine, pentadecyl-bis(2-propanol)amine, hexadecyl-bis(2-propanol)amine, heptadecyl-bis(2-propanol)amine, octadecyl-bis(2-propanol)amine, and isomers thereof.

7. The composition according to claim 6 wherein the amine (b) is selected from the group consisting of triethanolamine, tripropanolamine, triisopropanolamine, 8. The composition according to claim 2, wherein the amine is present in an amount of from 0.1 to 3 wt % based on the total weight of phosphate antioxidants.

9. The composition of claim 1, further comprising a polymer blended with or otherwise incorporating said polymer stabilizing composition, thereby generating a stabilized polymeric composition.

10. The composition of claim 9, wherein the stabilized polymeric composition comprises from 0.01 to 10% of the polymer stabilizing composition.

11. The composition of claim 9, wherein the at least one tris(monoalkylaryl)phosphite is selected from the group consisting of tris(4-t-butylphenyl)phosphite and tris(4-t-amylphenyl)phosphite,
wherein the alkanolamine is selected from the group consisting of triethanolamine, tripropanolamine and triisopropanolamine, and
wherein the alkanolamine is present in an amount of from 0.5 to 1.5 wt % based on the total weight of phosphite antioxidants present in the composition.

12. The composition of claim 9, wherein the polymer comprises a homopolymer, co-polymer, plastomer, elastomer or blend comprising any two or more thereof.

13. A polymer stabilizing composition, comprising:
(i) a first component comprising at least one phosphite antioxidant,
wherein said at least one phosphite antioxidant comprises solid tris(monoalkylaryl)phosphite,
wherein the solid tris(monoalkylaryl)phosphite is present in the composition 100 wt % with respect to the total amount of alkylaryl phosphite present in the composition; and
(ii) a second component comprising an alkanolamine, wherein the alkanolamine is present in an amount of from 0.1 to 3 wt % based on the total weight of the at least one phosphite antioxidant, and
wherein the polymer stabilizing composition is a solid at 25° C.

14. The polymer stabilizing composition according to claim 13, wherein the solid tris(monoalkylaryl)phosphite comprises a tris(4-monoalkylphenyl)phosphite of formula (I):

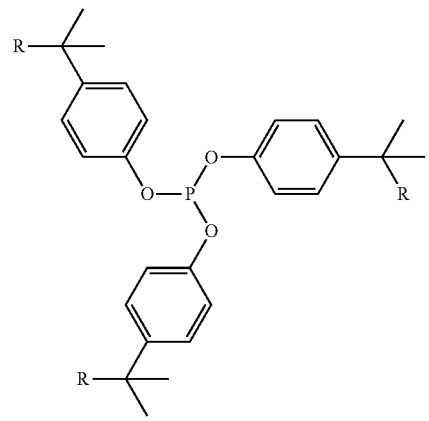

wherein each R is independently selected from $C_1$ to $C_5$ straight or branched chain alkyl.

15. The polymer stabilizing composition according to claim 14,
further comprising a polymer of a type selected from the group consisting of homopolymers, co-polymers, plastomers, elastomers, and a blend comprising any two or more thereof, and
wherein the polymer is stabilized and exhibits improvements in one or more of melt flow index, yellowness index, and gas fade properties, as compared to a polymer in the absence of the polymer stabilizing composition.

16. A polymer stabilizing composition, comprising:
(i) a first component comprising at least one phosphite antioxidant,
wherein said at least one phosphite antioxidant comprises one or more tris(4-monoalkylphenyl)phosphite of formula (I):

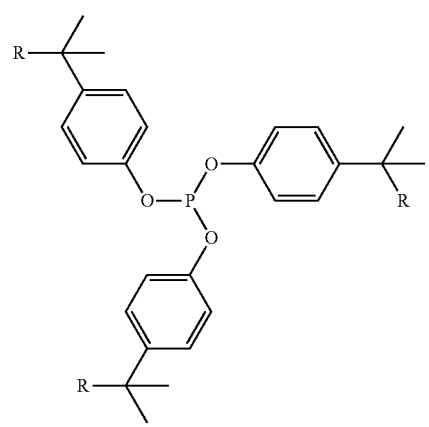

wherein each R is independently selected from $C_1$ to $C_5$ straight or branched chain alkyl, wherein the one or more tris(4-monoalkylphenyl)phosphate of formula (I) is present in the composition at 100 wt % with respect to the total amount of alkylaryl phosphate present in the composition; and (ii) a second component comprising an alkanolamine, wherein the alkanolamine is selected from the group consisting of triethanolamine, tripropanolamine and triisopropanolamine, and wherein the polymer stabilizing composition is a solid at 25° C.

17. The polymer stabilizing composition of claim 16, wherein the tris(4-monoalkylphenyl)phosphite is solid, and wherein each R in formula (I) is the same.

18. The polymer stabilizing composition of claim 16, wherein the alkanolamine is triisopropanolamine.

19. The polymer stabilizing composition of claim 16, wherein the tris(4-monoalkylphenyl)phosphite comprises one or more of tris(4-t-butylphenyl)phosphite and tris(4-t-amylphenyl)phosphite.

* * * * *